US011889417B2

United States Patent
Li et al.

(10) Patent No.: US 11,889,417 B2
(45) Date of Patent: Jan. 30, 2024

(54) GATEWAY DEVICE, WIRELESS EXTENDER, METHOD, DEVICE AND MEDIUM

(71) Applicant: ARRIS Enterprises LLC, Suwanee, GA (US)

(72) Inventors: Ju Li, Shenzhen (CN); Yu Zhang, Shenzhen (CN); Lidan Chen, Shenzhen (CN); Bo Chen, Shenzhen (CN); Ruilu Zeng, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 29 days.

(21) Appl. No.: 17/402,864

(22) Filed: Aug. 16, 2021

(65) Prior Publication Data
US 2022/0078705 A1    Mar. 10, 2022

(30) Foreign Application Priority Data
Sep. 9, 2020    (CN) .......................... 202010941166.9

(51) Int. Cl.
*H04W 52/02*    (2009.01)
*H04W 56/00*    (2009.01)
*H04W 88/16*    (2009.01)
*H04W 72/20*    (2023.01)
*H04W 16/26*    (2009.01)

(52) U.S. Cl.
CPC ..... *H04W 52/0216* (2013.01); *H04W 56/001* (2013.01); *H04W 72/20* (2023.01); *H04W 88/16* (2013.01); *H04W 16/26* (2013.01)

(58) Field of Classification Search
CPC .......... H04W 52/0216; H04W 56/001; H04W 72/1278; H04W 88/16; H04W 16/26; H04W 84/047; H04W 84/12; Y02D 30/70; H04L 12/12; H04L 12/66; H04L 67/1095
See application file for complete search history.

(56) References Cited

U.S. PATENT DOCUMENTS

| 10,299,210 | B2 * | 5/2019 | Kim ................. H04W 52/0229 |
| 11,412,471 | B2 * | 8/2022 | Tarighat Mehrabani .................... H04W 56/0015 |
| 2009/0245224 | A1 * | 10/2009 | Iyer ..................... H04W 56/003 370/345 |
| 2011/0177823 | A1 * | 7/2011 | Miao ...................... H04B 7/155 455/450 |

(Continued)

OTHER PUBLICATIONS

International Search Report and the Written Opinion of the International Searching Authority dated Nov. 26, 2021 in International (PCT) Application No. PCT/US2021/046080.

(Continued)

*Primary Examiner* — Habte Mered
(74) *Attorney, Agent, or Firm* — Wenderoth, Lind & Ponack, L.L.P.

(57) ABSTRACT

The present disclosure relates to a gateway device, wireless extender, method, device and medium. The gateway device comprises: a memory having an instruction stored thereon; and a processor configured to execute the instruction stored on the memory to cause the gateway device to execute the following operation: obtaining a schedule used to automatically turn on or turn off the radio transceiver function of the gateway device; and synchronizing the schedule to the wireless extender that is connected to the gateway device.

18 Claims, 7 Drawing Sheets

(56) References Cited

U.S. PATENT DOCUMENTS

| | | | | |
|---|---|---|---|---|
| 2014/0022973 | A1* | 1/2014 | Kopikare | H04W 52/0206 |
| | | | | 370/311 |
| 2014/0247780 | A1* | 9/2014 | Jafarian | H04W 52/0216 |
| | | | | 370/329 |
| 2016/0021502 | A1* | 1/2016 | Kim | H04W 4/02 |
| | | | | 455/456.1 |
| 2016/0142974 | A1* | 5/2016 | Lindoff | H04W 56/00 |
| | | | | 370/311 |
| 2017/0019853 | A1* | 1/2017 | Ghosh | H04W 52/0216 |
| 2017/0208574 | A1* | 7/2017 | Ramakrishna | H04L 5/0092 |
| 2019/0045534 | A1* | 2/2019 | Zaks | H04W 56/001 |
| 2021/0175971 | A1* | 6/2021 | Vardarajan | H04W 16/26 |

OTHER PUBLICATIONS

International Preliminary Report on Patentability and Written Opinion dated Mar. 23, 2023 in International Application No. PCT/US2021/046080.

* cited by examiner

GATEWAY DEVICE, WIRELESS EXTENDER, METHOD, DEVICE AND MEDIUM

TECHNICAL FIELD

The present disclosure relates to a gateway device, wireless extender, method, device and medium.

BACKGROUND ART

The user can set a schedule on the gateway device to automatically turn on or turn off the radio transceiver function based on the schedule set by the user. For example, the user can set the radio transceiver function of the gateway device to only turn on from 7 a.m. to 11 p.m. on working days and be kept on throughout the weekends.

However, in existing Wi-Fi systems, a wireless extender is also usually installed in addition to the gateway device. When the radio transceiver function of the gateway device is turned off, even if the radio transceiver function of the wireless extender is kept on, the user is unable to access external networks by connecting to the wireless extender. Therefore, in such cases, it is meaningless to keep the radio transceiver function of the wireless extender turned on, and it causes a wastage of power resources.

SUMMARY OF THE INVENTION

The present disclosure provides a technical solution that allows the schedule of the gateway device to be synchronized with the wireless extender. By synchronizing the schedule, the radio transceiver function of the gateway device and wireless extender can be synchronously turned on and/or turned off, thereby conserving power resources. In addition, user operations are also simplified as the user does not need to manually turn on and/or turn off the radio transceiver function of the wireless extender to synchronize the gateway device and wireless extender.

Some aspects of the present disclosure relate to a gateway device, comprising: a memory having an instruction stored thereon; and a processor configured to execute the instruction stored on the memory to cause the gateway device to execute the following operation: obtaining a schedule used to automatically turn on or turn off the radio transceiver function of the gateway device; and synchronizing the schedule to the wireless extender that is connected to the gateway device.

In some embodiments, where the wireless extender is connected to the gateway device through cables, synchronization is only carried out when the schedule is amended.

In some embodiments, where the wireless extender is wirelessly connected to the gateway device, synchronization is carried out if the radio transceiver function of the wireless extender is turned on when the schedule is amended.

In some embodiments, where the wireless extender is wirelessly connected to the gateway device, synchronization is carried out whenever the radio transceiver function of the wireless extender is turned on.

In some embodiments, the operation further comprises: sending the signal used to turn on or turn off the radio transceiver function of the wireless extender to the wireless extender when the radio transceiver function of the gateway device is manually turned on or turned off.

In some embodiments, synchronization comprises sending the full schedule to the wireless extender.

In some embodiments, synchronization comprises sending the amended part of the schedule to the wireless extender.

Other aspects of the present disclosure relate to a wireless extender, comprising: a memory having an instruction stored thereon; and a processor configured to execute the instruction stored on the memory to cause the gateway device to execute the following operation: synchronizing the schedule from the gateway device that is used to automatically turn on or turn off the radio transceiver function of the gateway device, wherein, the wireless extender is connected to the gateway device; and automatically turning on or turning off the radio transceiver function of the wireless extender based on the schedule.

In some embodiments, the operation further comprises: receiving the signal used to turn on or turn off the radio transceiver function of the wireless extender from the gateway device that is sent when the radio transceiver function of the gateway device is manually turned on or turned off.

In some embodiments, synchronization comprises receiving the full schedule from the gateway device.

In some embodiments, synchronization comprises receiving the amended part of the schedule from the gateway device.

Other aspects of the present disclosure relate to a method of execution of the gateway device, and the method comprises: obtaining a schedule used to automatically turn on or turn off the radio transceiver function of the gateway device; and synchronizing the schedule to the wireless extender that is connected to the gateway device.

Other aspects of the present disclosure relate to a method of execution of the wireless extender, and the method comprises: synchronizing the schedule from the gateway device that is used to automatically turn on or turn off the radio transceiver function of the gateway device, wherein, the wireless extender is connected to the gateway device; and automatically turning on or turning off the radio transceiver function of the wireless extender based on the schedule.

Other aspects of the present disclosure relate to a non-transitory computer-readable medium and the non-transitory computer-readable medium has an instruction stored thereon, where the instruction makes the processor execute the following operation when it is executed by the processor of the gateway device: obtaining a schedule used to automatically turn on or turn off the radio transceiver function of the gateway device; and synchronizing the schedule to the wireless extender that is connected to the gateway device.

Other aspects of the present disclosure relate to a non-transitory computer-readable medium and the non-transitory computer-readable medium has an instruction stored thereon, where the instruction makes the processor execute the following operation when it is executed by the processor of the wireless extender: synchronizing the schedule from the gateway device that is used to automatically turn on or turn off the radio transceiver function of the gateway device, wherein, the wireless extender is connected to the gateway device; and automatically turning on or turning off the radio transceiver function of the wireless extender based on the schedule.

Other aspects of the present disclosure relate to a device used for wireless communication, comprising a unit used to execute the method of the present disclosure.

DESCRIPTION OF ATTACHED DRAWINGS

For a better understanding of the present disclosure and to show how to implement the present disclosure, examples will be herein described with reference to the Attached Drawings, wherein.

It should be noted that throughout the attached drawings, similar reference numerals and signs refer to corresponding parts. In addition, multiple instances of the same part are designated by a common prefix separated from the instance number by a dash.

SPECIFIC EMBODIMENTS

The following detailed description is made with reference to the attached drawings, and the following detailed description is provided to facilitate comprehensive understanding of various exemplary embodiments of the present disclosure. The following description includes various details to facilitate understanding. However, these details are merely considered as examples, not for limiting the present disclosure. The present disclosure is defined by the appended claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the spirit and scope of the present disclosure.

Figure 1:
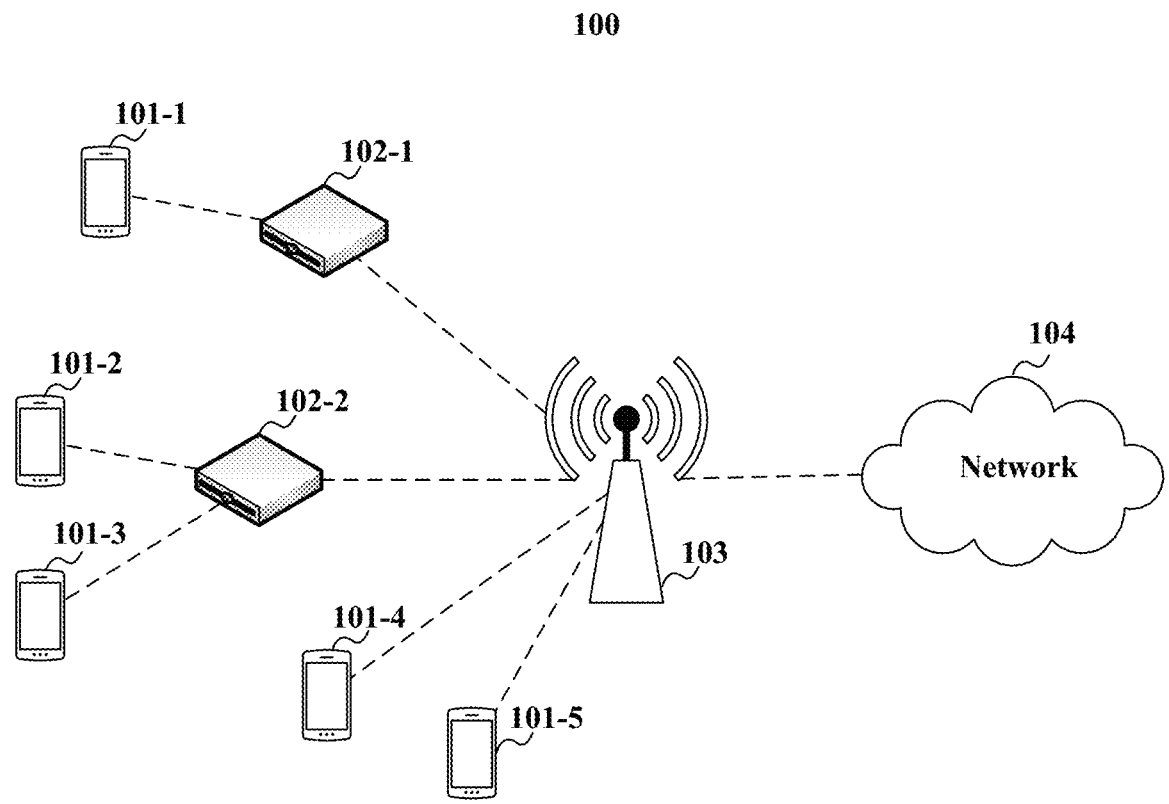
FIG. 1 shows the Wi-Fi system according to an embodiment of the present disclosure.

FIG. 1 shows the Wi-Fi system 100 according to an embodiment of the present disclosure. Wi-Fi system 100 comprises one or a plurality of client devices 101, one or a plurality of wireless extenders 102, a gateway device 103 and network 104 (such as LAN and WAN). One or a plurality of client devices 101 may comprise, but are not limited to, personal computers, laptop computers, mobile phones and Internet of Things (IoT) devices. One or a plurality of client devices 101 may use wireless communication compatible with IEEE 802.11 standards to directly connect to the gateway device 103, or connect to one or a plurality of any wireless extender 102 and communicate with gateway device 103 through this wireless extender. One or a plurality of wireless extenders 102 may be connected to the gateway device 103 through cables (such as twisted pair, coaxial cables and optical fiber), or wirelessly connected to the gateway device 103 by using wireless communication (such as Wi-Fi backhaul) compatible with IEEE 802.11 standards. Wireless communication compatible with IEEE 802.11 standards may appear in frequency bands such as 2.4 GHz, 5 GHz, 6 GHz and/or 60 GHz. It should be noted that IEEE 802.11ad communication on the 60 GHz frequency band is sometimes referred to as "WiGig". In this discussion, these embodiments are also covered by "Wi-Fi". However, various frequency bands may be used.

Figure 2:
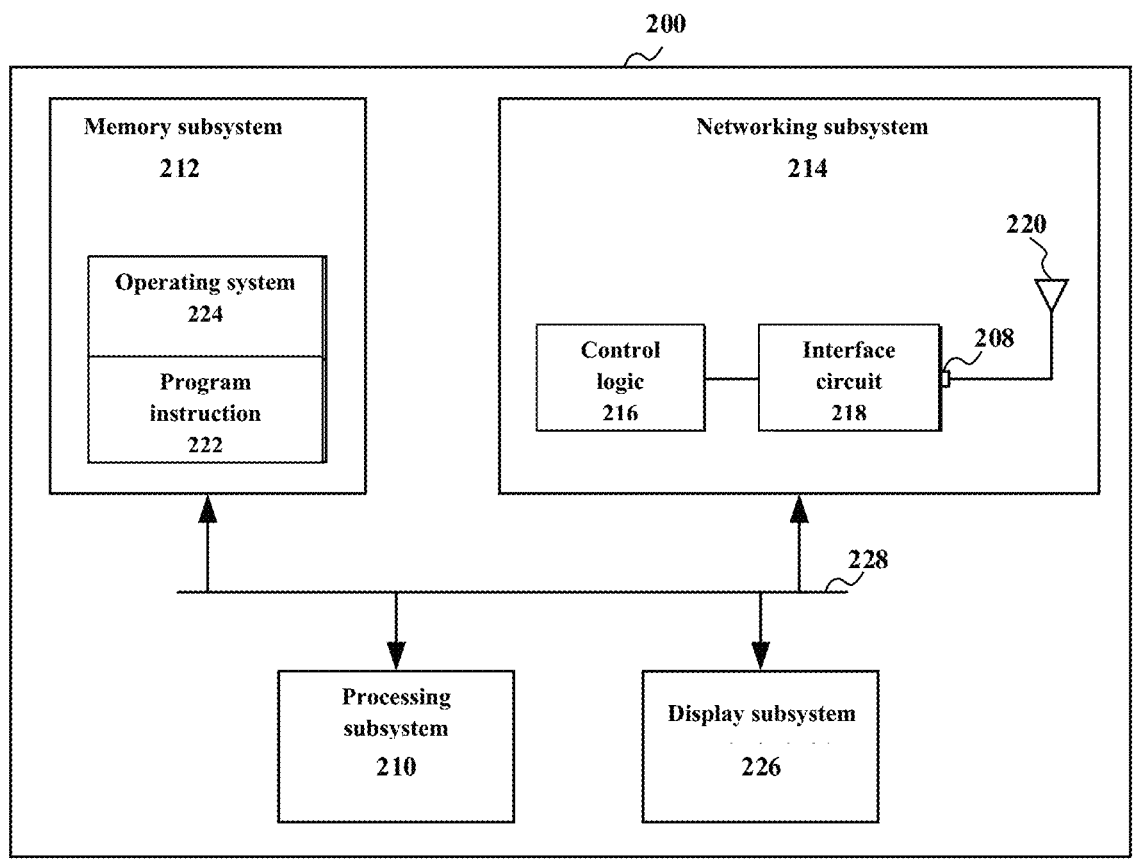
FIG. 2 is a block diagram of an example of an electronic device according to an embodiment of the present disclosure.

FIG. 2 is a block diagram of an example of an electronic device 200 according to an embodiment of the present disclosure. The gateway device 103 and/or the wireless extender 102 may be implemented using the structure of the electronic device 200. The electronic device 200 comprises a processing subsystem 210, a memory subsystem 212, and a networking subsystem 214. The processing subsystem 210 comprises one or a plurality of devices configured to execute computing operations. For example, the processing subsystem 210 may comprise one or more microprocessors, ASICs, microcontrollers, programmable logic devices, graphic processing units (GPU), and/or one or a plurality of digital signal processors (DSP).

The memory subsystem 212 comprises one or a plurality of devices for storing data and/or instructions used for the processing subsystem 210 and the networking subsystem 214. For example, the memory subsystem 212 may comprise a dynamic random access memory (DRAM), a static random access memory (SRAM), and/or other types of memory (sometimes collectively or individually referred to as "computer-readable storage medium"). In some embodiments, the instructions used in the memory subsystem 212 of the processing subsystem 210 comprise: one or a plurality of program modules or instruction sets (for example, a program instruction 222 or an operating system 224), which can be executed by the processing subsystem 210. It should be noted that one or a plurality of computer programs may constitute a computer program mechanism. In addition, an instruction in the various modules of the memory subsystem 212 may be implemented by the following: advanced programming languages, object-oriented programming languages and/or assembly or machine languages. Moreover, the programming language may be compiled or interpreted, for example, configurable or configured (used interchangeably in this discussion), to be executed by the processing subsystem 210.

In addition, the memory subsystem 212 may comprise a mechanism for controlling access to memory. In some embodiments, the memory subsystem 212 comprises a memory hierarchy, and the memory hierarchy comprises one or a plurality of caches coupled to the memory in the electronic device 200. In some of these embodiments, one or a plurality of the caches are located in the processing subsystem 210.

In some embodiments, the memory subsystem 212 is coupled to one or a plurality of high-capacity mass storage devices (not shown). For example, the memory subsystem 212 may be coupled to a magnetic or optical driver, a solid-state driver, or another type of mass storage device. In these embodiments, the electronic device 200 may use the memory subsystem 212 as a fast-access storage of frequently used data, whereas the mass storage device is used for storing infrequently used data.

The networking subsystem 214 comprises one or more devices configured to be coupled to a wired and/or wireless network and communicate over the wired and/or wireless network (i.e., to execute network operations), comprising: a control logic 216, an interface circuit 218, and one or a plurality of antennas 220 (or antenna elements). Although FIG. 2 comprises one or a plurality of antennas 220, in some embodiments, the electronic device 200 comprises one or a plurality of nodes, such as node 208, for example, solder pads, that can be coupled to one or a plurality of antennas 220. Therefore, the electronic device 200 may comprise or not comprise one or a plurality of antennas 220. For example, the networking subsystem 214 may comprise a Bluetooth networking system, cellular networking system (for example 3G/4G/5G network, such as UMTS and LTE), USB networking system, networking systems based on the standard described in IEEE 802.11 (for example, Wi-Fi networking system), Ethernet networking system, wide area network interface circuit, interface circuits used to connect to Internet (for example, Internet service provider (ISP) or multi-system operator (MSO) equipment) and/or another networking system.

The networking subsystem 214 comprises a processor, controller, radio device/antenna, socket/plug and/or other devices for coupling to each supported network system, communicating on each supported network system, and processing the data and events for each supported network system. Please note that sometimes the network for coupling to each network system, and the mechanisms used to communicate on that network, and process data and events on that network are collectively referred to as the "network interface" of the network system.

In the electronic device 200, a bus 228 is used to couple the processing subsystem 210, the memory subsystem 212, and the networking subsystem 214 together. The bus 228 may comprise electrical, optical, and/or electro-optical connections of the subsystems through commands, data and the like may be transmitted. Although only one bus 228 is shown for clarity, different embodiments may comprise different numbers or configurations of electrical, optical, and/or electro-optical connections in the subsystems.

In some embodiments, the electronic device 200 comprises a display subsystem 226 for displaying information on a display, and the display subsystem may comprise a display driver and a display, such as a liquid crystal display, and a multi-touch screen.

The electronic device 200 may be (or may be comprised in) any electronic device having at least one network interface. For example, the electronic device 200 may be (or may be comprised in): a desktop computer, a laptop computer, a sub-notebook/netbook, a server, a computer, a mainframe computer, a cloud-based computer, a tablet computer, a smart phone, a cellular phone, a smart watch, a wearable device, a consumer electronic device, a portable computing device, an access point, a transceiver, a controller, a radio node, a router, a switch, a communication device, an access point, a test device, a gateway device, a set-top box, a smart media device and/or other electronic devices.

Although specific components are used to describe the electronic device 200, in an alternative embodiment, there may be different components and/or subsystems in the electronic device 200. For example, the electronic device 200 may comprise one or a plurality of additional processing subsystems, memory subsystems, networking subsystems, and/or display subsystems. In addition, one or a plurality of the subsystems may not exist in the electronic device 200. Moreover, in some embodiments, the electronic device 200 may comprise one or a plurality of additional subsystems not shown in FIG. 2. In addition, although separate subsystems are shown in FIG. 2, in some embodiments, some or all of the given subsystems or components may be integrated into one or a plurality of the other subsystems or components in the electronic device 200. For example, in some embodiments, the program instruction 222 is comprised in the operating system 224, and/or the control logic 216 is comprised in the interface circuit 218.

Although Wi-Fi and/or Ethernet communication protocols are used in the discussion of the present specification as illustrative examples, in other embodiments, various communication protocols may be used, and more generally, communication technologies may be used. Therefore, communication technologies can be used in various network interfaces. In addition, although some operations in the aforementioned embodiments are implemented by hardware or software, in general, the operations in the aforementioned embodiments may be implemented in various configurations and frameworks. Therefore, some or all of the operations in the aforementioned embodiments may be executed by hardware, software, or both. For example, at least some operations in the communication technology can be implemented using the program instruction 222, the operating system 224 (such as a driver for the interface circuit 218), or firmware in the interface circuit 218. Alternatively or in addition, at least some operations in the communication technology may be implemented at physical layer, such as hardware in the interface circuit 218.

Figure 3:
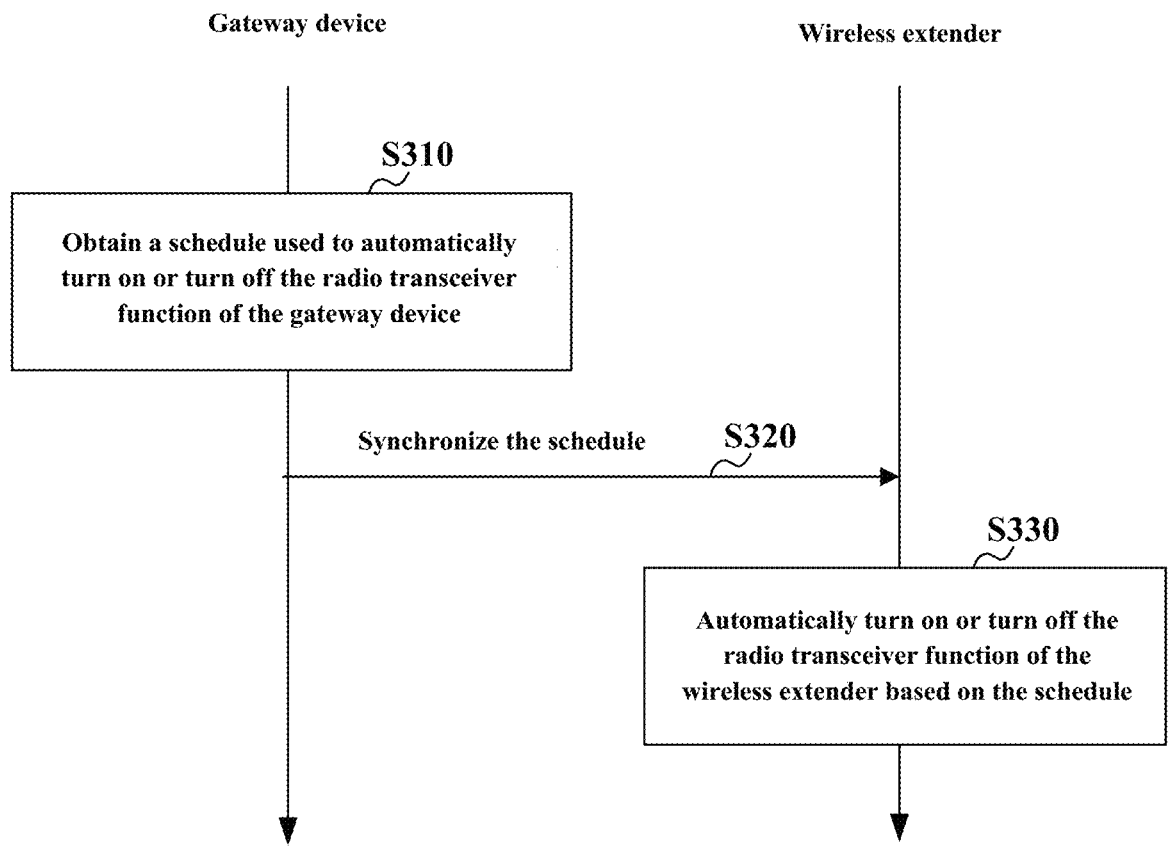
FIG. 3 shows the communication process executed between the gateway device and wireless extender according to an embodiment of the present disclosure.

FIG. 3 shows the communication process 300 executed between the gateway device and wireless extender according to an embodiment of the present disclosure;

In Step S310, the gateway device obtains the schedule used to automatically turn on or turn off the radio transceiver function of the gateway device. This schedule may be pre-stored in the memory of the gateway device. This schedule may be created or amended by the user through the gateway device or the user interface on the computing device connected to the gateway device, then stored in the memory of the gateway device. This schedule may designate the time for the gateway device to automatically turn on its radio transceiver function and/or automatically turn off its radio transceiver function. Turning on or turning off the radio transceiver function of the gateway device refers to turning on or turning off the circuit and/or component implementing the radio transceiver function in the gateway device.

In Step S320, the gateway device synchronizes the schedule with the wireless extender connected to the gateway device. This synchronization comprises sending the full or only amended parts of the schedule from the gateway device to the wireless extender.

In Step S330, the wireless extender automatically turns on or turns off the radio transceiver function of the wireless extender based on the schedule. Turning on or turning off the radio transceiver function of the wireless extender refers to turning on or turning off the circuit and/or component implementing the radio transceiver function in the wireless extender. It should be noted that although it is not shown in FIG. 3, the gateway device may automatically turn on or turn off its radio transceiver function based on this schedule.

After synchronizing the schedule, the gateway device and wireless extender turn on or turn off the radio transceiver function based on the same schedule, thereby realizing the synchronization of the wireless transceiver function of the gateway device and wireless extender. Therefore, this can prevent a wastage of power resources from keeping the radio transceiver function of the wireless extender turned on when the radio transceiver function of the gateway device is turned off.

The wireless extender may be connected to the gateway device through cables (for example, twisted pair, coaxial cables or optical fiber), or wirelessly connected to the gateway device by using wireless communication (such as Wi-Fi backhaul) compatible with IEEE 802.11 standards. Where the wireless extender is connected to the gateway device through cables, even if the radio transceiver function of the wireless extender is turned off, the wireless extender and gateway device are able to communicate through cables. However, where the wireless extender is wirelessly connected to the gateway device, if the radio transceiver function of the wireless extender is turned off, the wireless extender and gateway device are unable to communicate. Therefore, the synchronization of the schedule between the gateway device and wireless extender connected with these two methods is respectively discussed below.

Figure 4:
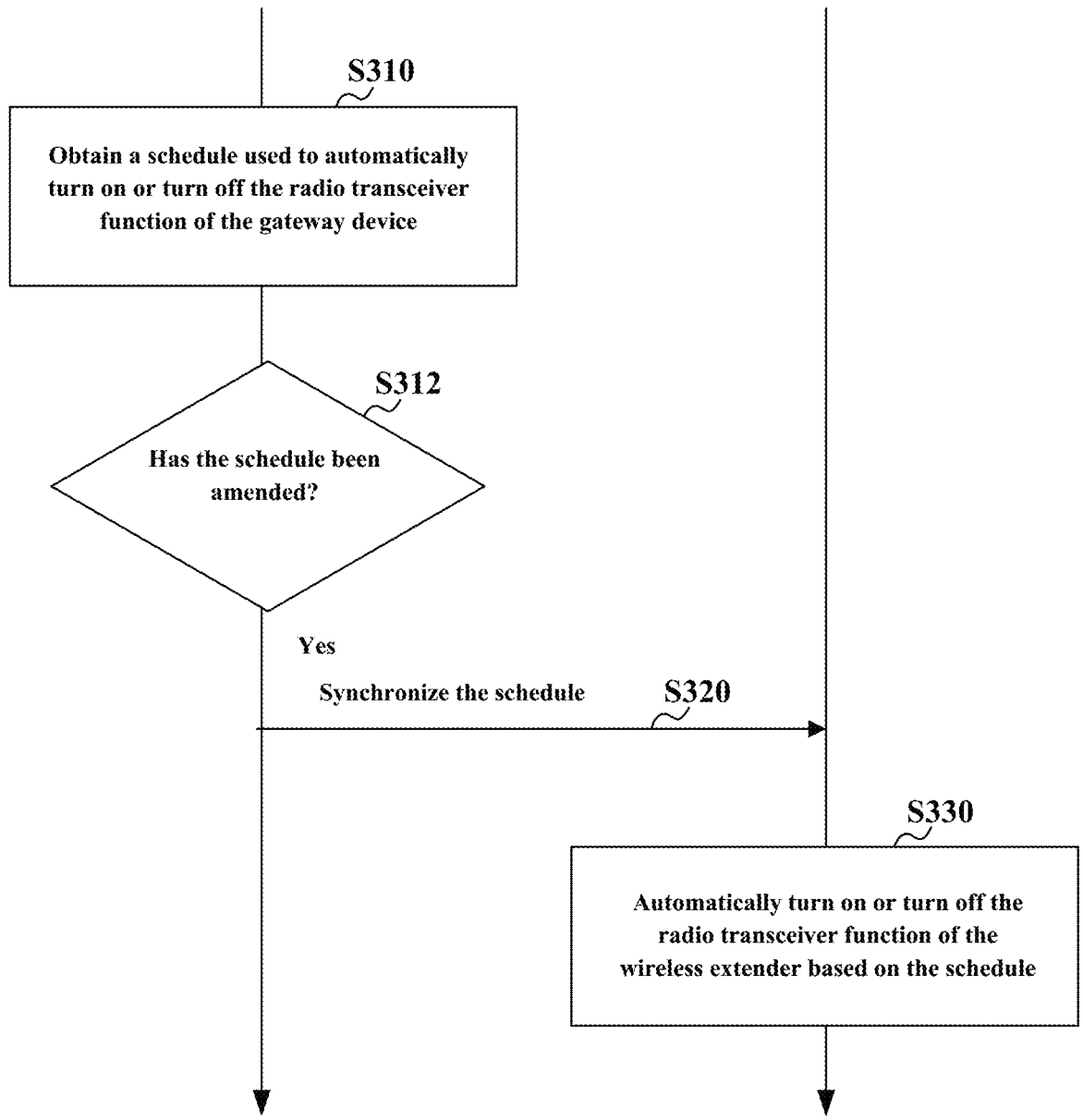
FIG. 4 shows the communication process when the wireless extender is connected to the gateway device through cables according to an embodiment of the present disclosure.

FIG. 4 shows the communication process 400 when the wireless extender is connected to the gateway device through cables according to an embodiment of the present disclosure. In this case, even when the radio transceiver function of the wireless extender is turned off, the wireless extender and gateway device are able to communicate through cables. Therefore, the schedule may be synchronized only when the schedule is amended.

As shown in FIG. 4, in Step S310, the gateway device obtains the schedule used to automatically turn on or turn off the radio transceiver function of the gateway device. In Step S312, the gateway device confirms whether the schedule is amended. If the schedule is amended, the communication process 400 proceeds to Step S320. In Step S320, the gateway device synchronizes the schedule with the wireless extender connected to the gateway device. In Step S330, the wireless extender automatically turns on or turns off the radio transceiver function of the wireless extender based on the schedule.

Figure 5:
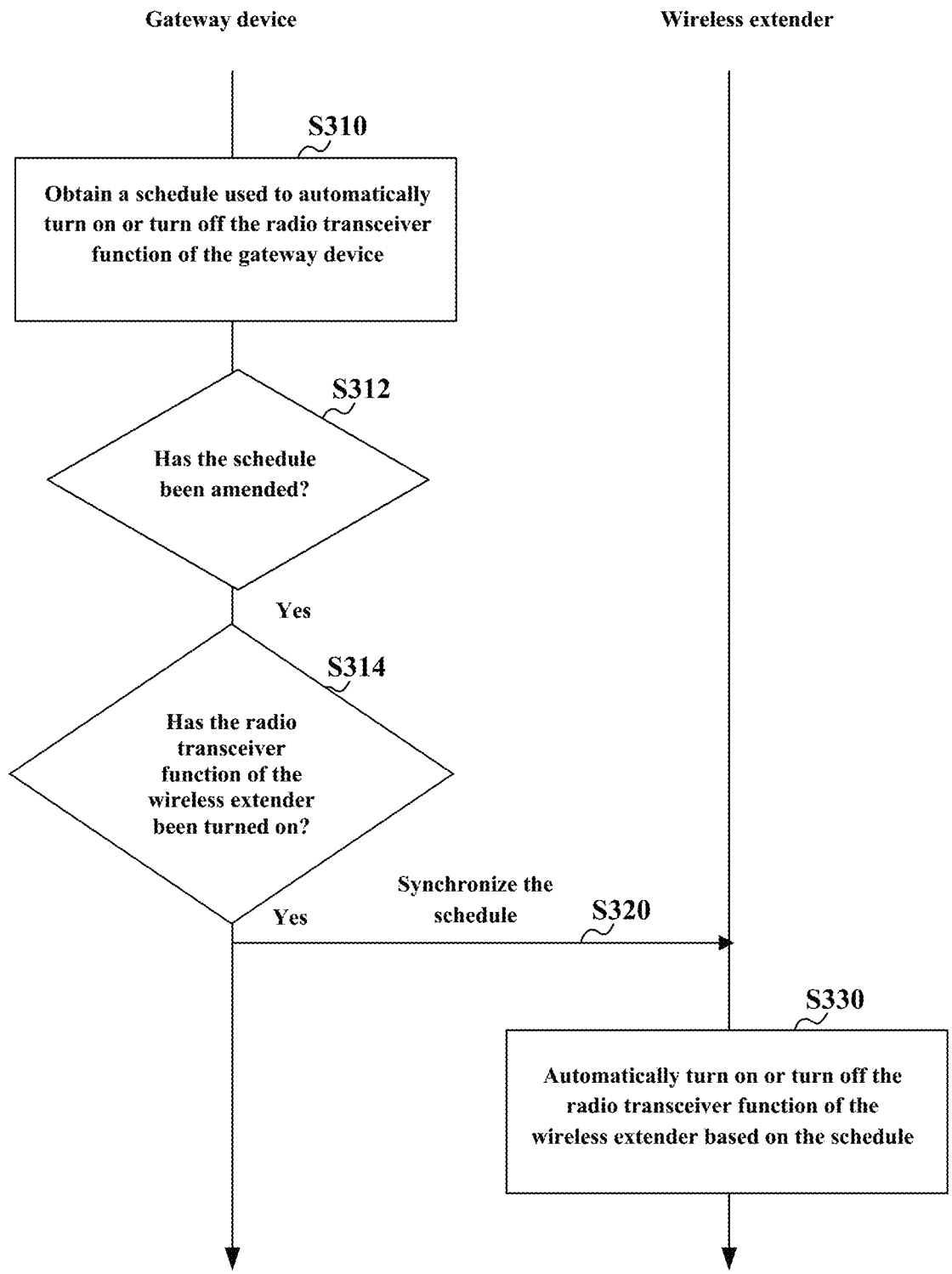
FIG. 5 shows the communication process when the wireless extender is wirelessly connected to the gateway device according to an embodiment of the present disclosure.

FIG. 5 shows the communication process 500 when the wireless extender is wirelessly connected to the gateway device according to an embodiment of the present disclosure. In this case, if the radio transceiver function of the wireless extender is turned off, the wireless extender and gateway device are unable to communicate. Therefore, if the radio transceiver function of the wireless extender is turned on when the schedule is amended, the schedule is synchronized.

As shown in FIG. 5, in Step S310, the gateway device obtains the schedule used to automatically turn on or turn off the radio transceiver function of the gateway device. In Step S312, the gateway device confirms whether the schedule is amended. If the schedule is amended, the communication process 500 proceeds to Step S314. In Step S314, the gateway device confirms whether the radio transceiver function of the wireless extender is turned on. If the radio transceiver function of the wireless extender is not turned on, a prompt on temporary failure to synchronize the schedule may be displayed on the gateway device or user interface of the computing device connected to the gateway device (not shown). If the radio transceiver function of the wireless extender is turned on, the communication process 500 proceeds to Step S320. In Step S320, the gateway device synchronizes the schedule with the wireless extender connected to the gateway device. In Step S330, the wireless extender automatically turns on or turns off the radio transceiver function of the wireless extender based on the schedule.

Figure 6:
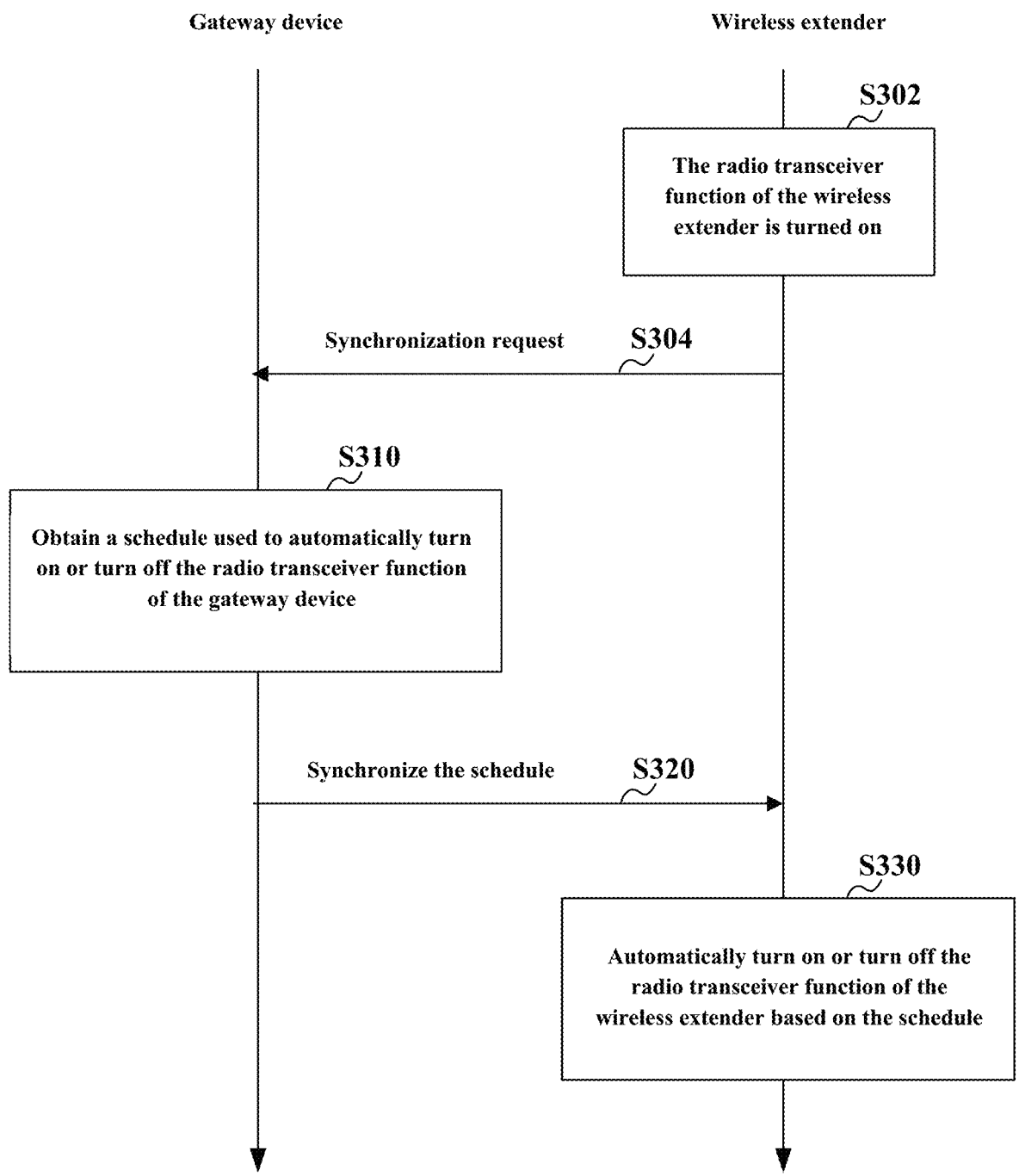
FIG. 6 shows another communication process when the wireless extender is wirelessly connected to the gateway device according to an embodiment of the present disclosure.

FIG. 6 shows another communication process 600 when the wireless extender is wirelessly connected to the gateway device according to an embodiment of the present disclosure. In this case, if the radio transceiver function of the wireless extender is turned off, the wireless extender and gateway device are unable to communicate. Therefore, the schedule is synchronized every time the radio transceiver function of the wireless extender is turned on. However, even if the schedule is amended when the radio transceiver function of the wireless extender is turned off, synchronization of the schedule may resume when the radio transceiver function of the wireless extender is turned on.

As shown in FIG. 6, in Step S302, the radio transceiver function of the wireless extender is turned on. In Step S304, the wireless extender sends a synchronization request to the gateway device. In Step S310, the gateway device obtains the schedule used to automatically turn on or turn off the radio transceiver function of the gateway device. In Step S320, the gateway device synchronizes the schedule with the wireless extender connected to the gateway device. In Step S330, the wireless extender automatically turns on or turns off the radio transceiver function of the wireless extender based on the schedule.

In addition, in some cases, the radio transceiver function of the gateway device may be manually turned on or turned off, i.e., it is not turned on or turned off based on the schedule. For example, the user may turn on or turn off the radio transceiver function of the gateway device through the gateway device or the user interface on the computing device of the gateway device, or turn on or turn off the radio transceiver function of the gateway device through the switch on the gateway device. At this time, the turn-on or turn-off signal may be sent to the wireless extender to turn on or turn off the radio transceiver function of the wireless extender. This keeps the turning on and/or turning off the radio transceiver function of the gateway device and wireless extender synchronized.

Figure 7:
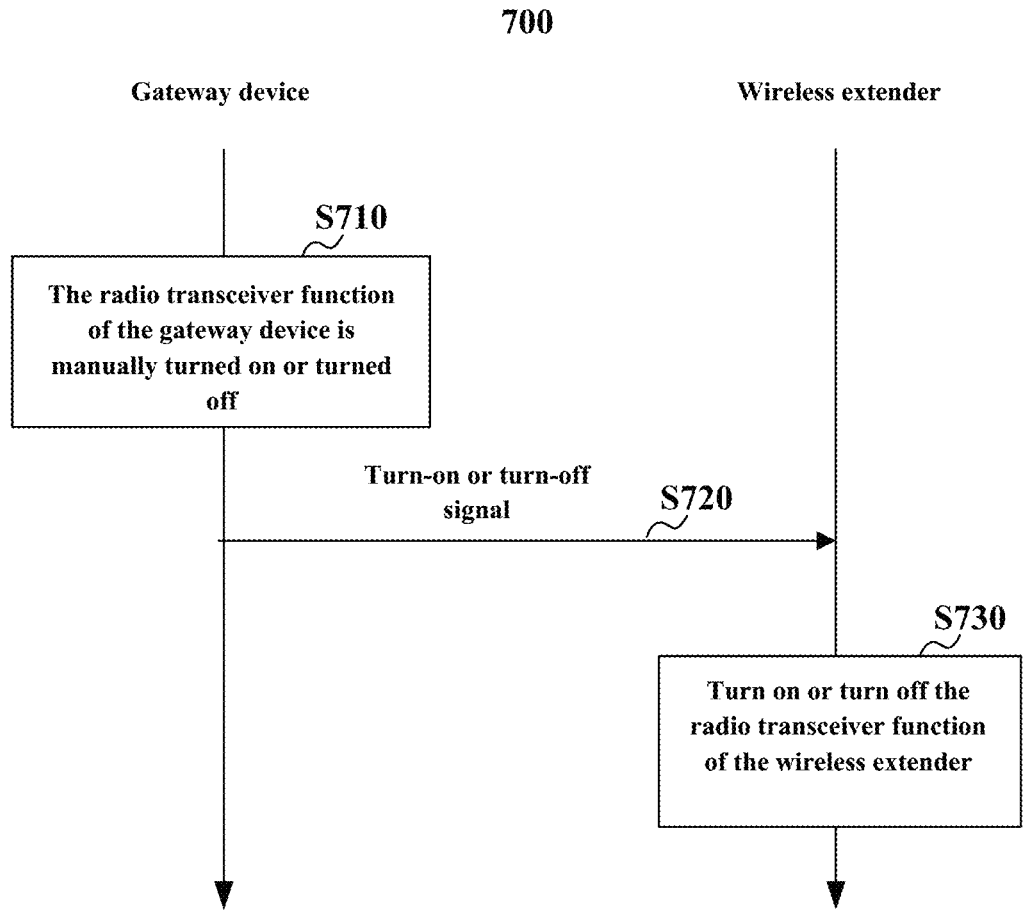
FIG. 7 shows the communication process when the radio transceiver function of the gateway device is manually turned on or turned off according to an embodiment of the present disclosure.

FIG. 7 shows the communication process 700 when the radio transceiver function of the gateway device is manually turned on or turned off according to an embodiment of the present disclosure.

In Step S710, the radio transceiver function of the gateway device is manually turned on or turned off. In Step S720, the turn-on or turn-off signal is sent from the gateway device to the wireless extender. In Step S730, the wireless extender turns on or turns off its radio transceiver function.

In some embodiments of the present disclosure, the wireless extender may feedback the turn-on or turn-off response to the gateway device after receiving the turn-on or turn-off signal. If the gateway device does not receive the turn-on or turn-off response from the wireless extender, it periodically sends a preset number of turn-on or turn-off responses.

Where the wireless extender is connected to the gateway device through cables, even if the radio transceiver function of the wireless extender is turned off, the wireless extender and gateway device are able to communicate through cables. In this case, the wireless extender is able to promptly receive the turn-on or turn-off signal from the gateway device, and promptly feedback the turn-on or turn-off response to the gateway device.

Where the wireless extender is wirelessly connected to the gateway device, if the radio transceiver function of the wireless extender is turned on, the wireless extender is able to promptly receive the turn-on or turn-off signal from the gateway device, and promptly feedback the turn-on or turn-off response of the gateway device. If the radio transceiver function of the wireless extender is turned off, the wireless extender and gateway device are unable to communicate. In this case, the wireless extender can periodically wake up its radio transceiver function to test whether there are turn-on signals from the gateway device. If the wireless extender receives a turn-on signal from the gateway device, the gateway device feedbacks the turn-on response and keeps the radio transceiver function turned on.

The embodiments of the present disclosure automatically synchronize the schedule between the gateway device and wireless extender, realizing the synchronization of the turning on and/or turning off of the radio transceiver function of the gateway device and wireless extender. Therefore, the technical solution of the embodiments of the present disclosure can prevent a wastage of power resources from keeping the radio transceiver function of the wireless extender turned on when the radio transceiver function of the gateway device is turned off. In addition, the technical solution of the embodiments of the present disclosure can also simplify user operations as the user does not need to manually turn on and/or turn off the radio transceiver function of the wireless extender to synchronize the gateway device and wireless extender.

The present disclosure can be implemented as any combination of devices, systems, integrated circuits, and computer programs on non-transitory computer-readable media. One or a plurality of processors can be implemented as an integrated circuit (IC), an application specific integrated circuit (ASIC) or a large-scale integrated circuit (LSI), a system LSI, or a super LSI or super LSI component that performs part or all of the functions described in the present disclosure.

The present disclosure comprises the use of software, applications, computer programs, or algorithms. Software, application programs, computer programs or algorithms can be stored on a non-transitory computer readable medium, so that a computer with one or a plurality of processors can execute the above steps and the steps described in the drawings. For example, one or a plurality of memory store software or algorithms by executable instructions, and one or a plurality of processors can associate the execution of a set of instructions of the software or algorithms to provide monitoring and installation enhancement in any number of wireless networks according to the embodiments described in the present disclosure.

Software and computer programs (also called programs, software applications, applications, components, or codes) comprise machine instructions for programmable processors, and can be realized in high-level procedural languages, object-oriented programming languages, functional programming languages, logic programming languages, or assembly languages or machine languages. The term "computer-readable medium" refers to any computer program product or device used to provide machine instructions or data to the programmable data processor, such as magnetic disks, optical disks, solid-state storage devices, memory, and programmable logic devices (PLD), comprising computer-readable media that receive machine instructions as computer-readable signals.

For example, the computer-readable medium may comprise dynamic random access memory (DRAM), random access memory (RAM), read-only memory (ROM), electrically erasable programmable read-only memory (EE-PROM), compact disk read-only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks comprise compact discs (CDs), laser disks, optical disks, digital versatile discs (DVDs), floppy disks, and Blu-ray disks, where magnetic disks usually copy data magnetically, and disks use laser to optically copy data. Combinations of the above also fall into the scope of computer-readable media.

In one or a plurality of embodiments, the use of the words "able", "can", "operable as" or "configured as" refers to some devices, logics, hardware and/or elements designed to be used in a specified manner. The subject matter of the present disclosure is provided as an example of the device, system, method, and program for performing the features described in the present disclosure. However, in addition to the above features, other features or modifications can be expected. It is expected that any newly emerging technology that may replace any of the above implementation technologies can be used to complete the implementation of the components and functions of the present disclosure.

In addition, the above description provides examples without limiting the scope, applicability, or configuration set forth in the claims. Without departing from the spirit and scope of the present disclosure, changes may be made to the function and arrangement of the discussed elements. Various embodiments may omit, substitute, or add various processes or components as appropriate. For example, features described with respect to some embodiments may be combined in other embodiments.

Similarly, although operations are depicted in a specific order in the attached drawings, this should not be understood as requiring such operations to be performed in the specific order shown or in a sequential order, or requiring the execution of all illustrated operations to achieve the desired result. In some cases, multi-tasking and parallel processing can be advantageous.

The invention claimed is:

1. A gateway device, comprising:
a memory having an instruction stored thereon; and
a processor configured to execute the instruction to:
obtain a schedule used to automatically turn on or turn off a radio transceiver function of the gateway device, wherein automatically turning on or turning off the radio transceiver function of the gateway device requires turning on or turning off a circuit, a component, or both that implement the radio transceiver function of the gateway device;
synchronize the schedule to the wireless extender that is connected to the gateway device to cause the wireless transceiver function of the wireless extender and the radio transceiver function of the gateway device to be based on the schedule; and
send a signal used to turn off the radio transceiver function of the wireless extender to the wireless extender when the radio transceiver function of the gateway device is manually turned off.

2. The gateway device of claim 1, wherein:
the wireless extender is connected to the gateway device through one or more cables; and
synchronization is only carried out when the schedule is amended.

3. The gateway device of claim 1, wherein:
the wireless extender is wirelessly connected to the gateway device; and
synchronization is carried out if the radio transceiver function of the wireless extender is turned on, such that the wireless extender and the gateway device can communicate, when the schedule is amended.

4. The gateway device of claim 1, wherein:
the wireless extender is wirelessly connected to the gateway device; and synchronization is carried out whenever the radio transceiver function of the wireless extender is turned on.

5. The gateway device of claim 1, wherein the processor is further configured to execute the instruction to:
send a signal used to turn on or turn off the radio transceiver function of the wireless extender to the wireless extender when the radio transceiver function of the gateway device is manually turned on or turned off.

6. The gateway device of claim 1, wherein:
synchronization comprises sending a full schedule of the schedule to the wireless extender.

7. The gateway device of claim 1, wherein:
synchronization comprises sending an amended part of the schedule to the wireless extender.

8. A wireless extender, comprising:
a memory having an instruction stored thereon; and
a processor, configured to execute the instruction to:
synchronize a schedule from a gateway device connected to the wireless extender to cause a wireless transceiver function of the wireless extender and a radio transceiver function of the gateway device to be based on the schedule, wherein the schedule is used to automatically turn on or turn off the wireless transceiver function of the wireless extender;
automatically turn on or turn off the wireless transceiver function of the wireless extender based on the schedule, wherein automatically turning on or turning off the wireless transceiver function of the wireless extender requires turning on or turning off a circuit, a component, or both that implement the wireless transceiver function of the wireless extender; and
receive a signal used to turn off the radio transceiver function of the wireless extender from the gateway device that is sent when the radio transceiver function of the gateway device is manually turned off.

9. The wireless extender of claim 8, wherein:
the wireless extender is connected to the gateway device through one or more cables; and
synchronization is only carried out when the schedule is amended.

10. The wireless extender of claim 8, wherein:
the wireless extender is wirelessly connected to the gateway device; and
synchronization is carried out if the radio transceiver function of the wireless extender is turned on, such that the wireless extender and the gateway device can communicate, when the schedule is amended.

11. The wireless extender of claim 8, wherein:
the wireless extender is wirelessly connected to the gateway device; and
synchronization is carried out whenever the radio transceiver function of the wireless extender is turned on.

12. The wireless extender of claim 8, wherein the processor is further configured to execute the instruction to:
receive a signal used to turn on or turn off the radio transceiver function of the wireless extender from the gateway device that is sent when the radio transceiver function of the gateway device is manually turned on or turned off.

13. The wireless extender of claim 8, wherein:
synchronization comprises receiving a full schedule of the schedule from the gateway device.

14. The wireless extender of claim 8, wherein:
synchronization comprises receiving an amended part of the schedule from the gateway device.

15. A method by a gateway device, comprising:
obtaining a schedule used to automatically turn on or turn off the radio transceiver function of the gateway device, wherein automatically turning on or turning off the radio transceiver function of the gateway device requires turning on or turning off a circuit, a component, or both that implement the radio transceiver function of the gateway device;
synchronizing the schedule to the wireless extender that is connected to the gateway device to cause the wireless transceiver function of the wireless extender and the radio transceiver function of the gateway device to be based on the schedule; and
sending a signal used to turn off the radio transceiver function of the wireless extender to the wireless extender when the radio transceiver function of the gateway device is manually turned off.

16. A method by a wireless extender, comprising:
synchronizing a schedule from the gateway device connected to the wireless extender to cause a wireless transceiver function of the wireless extender and a radio transceiver function of the gateway device to be based on the schedule, wherein the schedule is used to automatically turn on or turn off the wireless transceiver function of the wireless extender;
automatically turning on or turning off the radio wireless transceiver function of the wireless extender based on the schedule, wherein automatically turning on or turning off the wireless transceiver function of the wireless extender requires turning on or turning off a circuit, a component, or both that implement the wireless transceiver function of the wireless extender; and
receiving a signal used to turn off the radio transceiver function of the wireless extender from the gateway device that is sent when the radio transceiver function of the gateway device is manually turned off.

17. A non-transitory computer-readable medium of a gateway device having one or more instructions stored thereon, the one or more instructions when executed by a processor of the gateway device, cause the gateway device to perform one or more operations comprising:
obtaining a schedule used to automatically turn on or turn off the radio transceiver function of the gateway device, wherein automatically turning on or turning off the radio transceiver function of the gateway device requires turning on or turning off a circuit, a component, or both that implement the radio transceiver function of the gateway device;
synchronizing the schedule to the wireless extender that is connected to the gateway device to cause the wireless transceiver function of the wireless extender and the radio transceiver function of the gateway device to be based on the schedule; and
sending a signal used to turn off the radio transceiver function of the wireless extender to the wireless extender when the radio transceiver function of the gateway device is manually turned off.

18. A non-transitory computer-readable medium of a wireless extender having one or more instructions stored thereon, the one or more instructions when executed by a processor of the wireless extender causes the wireless extender to perform one or more operations comprising:
synchronizing a schedule from the gateway device connected to the wireless extender to cause a wireless transceiver function of the wireless extender and a radio transceiver function of the gateway device to be based on the schedule, wherein the schedule is used to automatically turn on or turn off the wireless transceiver function of the gateway device;

automatically turning on or turning off the wireless transceiver function of the wireless extender based on the schedule, wherein automatically turning on or turning off the wireless transceiver function of the wireless extender requires turning on or turning off a circuit, a component, or both that implement the wireless transceiver function of the wireless extender; and receiving a signal used to turn off the radio transceiver function of the wireless extender from the gateway device that is sent when the radio transceiver function of the gateway device is manually turned off.

* * * * *